(12) United States Patent
Dakhil

(10) Patent No.: US 12,122,537 B2
(45) Date of Patent: Oct. 22, 2024

(54) HELIUM POWERED SPACE TRANSPORT

(71) Applicant: Farouk Dakhil, Rome (IT)

(72) Inventor: Farouk Dakhil, Rome (IT)

( * ) Notice: Subject to any disclaimer, the term of this patent is extended or adjusted under 35 U.S.C. 154(b) by 462 days.

(21) Appl. No.: 17/497,143

(22) Filed: Oct. 8, 2021

(65) Prior Publication Data

US 2022/0119132 A1 Apr. 21, 2022

Related U.S. Application Data

(60) Provisional application No. 63/092,133, filed on Oct. 15, 2020.

(51) Int. Cl.
| | | |
|---|---|---|
| *B64G 1/00* | (2006.01) |
| *B64B 1/34* | (2006.01) |
| *B64B 1/36* | (2006.01) |
| *B64B 1/60* | (2006.01) |
| *B64B 1/62* | (2006.01) |

(52) U.S. Cl.
CPC ............... *B64G 1/002* (2013.01); *B64B 1/34* (2013.01); *B64B 1/36* (2013.01); *B64B 1/60* (2013.01); *B64B 1/62* (2013.01)

(58) Field of Classification Search
CPC .......... B64G 1/005; B64G 1/002; B64B 1/36; B64B 1/34; B64B 1/32; B64B 1/26
See application file for complete search history.

(56) References Cited

U.S. PATENT DOCUMENTS

| | | | | |
|---|---|---|---|---|
| 9,537,368 | B2 * | 1/2017 | Dakhil | H02K 7/06 |
| 10,272,986 | B2 * | 4/2019 | Taylor | B64C 27/08 |
| 2010/0044494 | A1 * | 2/2010 | Teacherson | B64G 1/005 |
| | | | | 244/171.3 |
| 2015/0076279 | A1 * | 3/2015 | Nelson | B64B 1/34 |
| | | | | 244/30 |
| 2022/0127017 | A1 * | 4/2022 | Takács | B64G 1/005 |
| 2022/0242547 | A1 * | 8/2022 | Frey | B64B 1/40 |

FOREIGN PATENT DOCUMENTS

| | | | |
|---|---|---|---|
| EP | 0 872 413 A2 | 10/1998 | |
| GB | 2229155 A * | 9/1990 | ............. B64G 1/005 |

OTHER PUBLICATIONS

Kadla et al., "Lignin-based carbon fibers for composite fiber applications", Carbon, vol. 20, Issue 15, 2002, pp. 2913-2920. (Year: 2002).*

(Continued)

*Primary Examiner* — Richard Green
(74) *Attorney, Agent, or Firm* — Maier & Maier, PLLC

(57) ABSTRACT

An earth to space transport method, system and apparatus. The earth to space transport system can include a main body; a plurality of storage tanks disposed in an inside of the main body, the storage tanks configured to store helium; one or more electric jet propulsion turbines coupled to the main body; a first inflatable cushion disposed at a top of the main body and a second inflatable cushion disposed at a bottom of the main body; a space capsule disposed above the first inflatable cushion; a power generator; and a rotor propeller. Such an earth to space transport system may be utilized to efficiently move humans, satellites and cargo from earth to space.

10 Claims, 7 Drawing Sheets

(56) References Cited

OTHER PUBLICATIONS

Popescu et al., "Building the space elevator: lessons from biological design", J. R. Soc. Interface 15, 2018; 12 pages.
Smitherman, Jr., "Critical Technologies for the Development of Future Space Elevator Systems", NASA Marshall Space Flight Center, IAC-05-D4.2.04; 11 pages.
Hontz et al., "Space Elevators A Study in Cable Design and More", New Jersey Governor's School of Engineering and Technology, 2016; 20 pages.
Penoyre and Sandford, "The Spaceline: a Practical Space Elevator Alternative Achievable With Current Technology", Cornell University, arXiv: Instrumentation and Methods for Astrophysics, 2019; 17 pages.
Edwards et al., "The Space Elevator", 2003; 80 pages.
Nixon, "Space Elevator Technology and Graphene", 2018, Interview conducted by Zoe Peterkin; 9 pages.
Sanderson, "Space elevators: going up?", Nature, 2007; https://www.nature.com/articles/news.2007.180; 6 pages.
Smitherman, Jr. et al., "Technology Development and Demonstration Concepts for the Space Elevator", 55th International Astronautical Congress, 2004; 11 pages.
Aravind, "The physics of the space elevator", Am. J. Phys., 2007, pp. 125-130, 75 (2); 6 pages.
Bobrick and Martire, "Introducing Physical Warp Drives", 2021; arXiv:2102.06824v2 [gr-qc]; 24 pages.
Zhu et al., "The Great Reduction of Carbon Nanotube's Mechanical Performance by a Few Topological Defects", ACS Nano, 2016; 17 pages.
Ndao et al., "Octave bandwidth photonic fishnet-achromatic-metalens", Nature Communications, 2020; https://doi.org/10.1038/s41467-020-17015-9; 6 pages.

\* cited by examiner

HELIUM POWERED SPACE TRANSPORT

CROSS-REFERENCE TO RELATED APPLICATIONS

The present patent application claims benefit and priority to U.S. Provisional Patent Application No. 63/092,133 entitled "Helium Powered Space Elevator" filed on Oct. 15, 2020 which is hereby incorporated by reference into the present disclosure.

BACKGROUND

NASA and other private large engineering corporations, like SpaceX, have tried and still trying to overcome the prohibitively expensive, dangerous, and explosive rocket propellants (most commonly used are liquid oxygen, alcohol, kerosene, and liquid hydrogen) in order to overcome the force of gravity. The Saturn 5, for example, that brought the three astronauts to the moon in 1969 had 90% of its weight as propellants. The expensive and dangerous chemical materials for rocket propulsion as means of transportation for satellites, equipment, and/or even astronauts to and from the ISS "International Space Station" is the problem that needs a viable solution. spaceX has launched a reusable rocket that should be used again for several space trips, but as recently has been reported, the rocket exploded as it landed (see Marcia Dunn "SpaceX Starship lands upright, then explodes in latest test").

In 1986, the space shuttle Challenger exploded 73 seconds after liftoff, killing the seven crewmembers and changing NASA's space program forever. Then, on Feb. 1, 2003, the Space Shuttle Columbia (OV-102) disintegrated as it reentered the atmosphere, killing all seven crewmembers. The disaster was the second fatal accident in the Space Shuttle program, after the 1986 breakup of Challenger soon after liftoff.

According to NASA's statistics around 50% of all rockets missions ended in a catastophic explosion.

Many materials scientists, NASA engineers, astrophysicists, and other scientist have tried to build a solution using nanotubes of CNT due to the resilience of CNT being 200 times stronger than steel, but the technology is not ready also because CNT cannot be made into such long enough yarns of some 100000 km length (See Bradley C. Edwards, the NASA Institute for Advanced Concepts (NIAC) program. "The Space Elevator" has a cable of an incredible length of 55,000 miles (91,000 km) and a weight of 20,000 Kg.

This NASA proposed space elevator must also be located at the Earth's equator and must also have a counter weight platform at the the end of the elevator in outer space and/or at very high altitude.

SUMMARY

To overcome all of these difficulties and avoid the rocket propulsion technology in which large amount of polluting and dangerous fuels in order just to overcome the force of gravity and propel the rocket and its astronauts into space, the embodiments use enucous gas helium, which is lighter than air and inflammable, unlike hydrogen.

NASA's suggested space elevator needs to be at the equator and needs a counter platform on the upper end of the elevator to balance its weight at some 100000 km above ground. Additionally, NASA also looked into a fusion or nuclear propulsion reactors but all were not realistic or feasible solutions.

However, the embodiments of a space elevator herein neither need to be at the equato—they can be anywhere on the globe-, nor do they need any counterweights or counterweight platform.

Further, the space elevator is a stand-alone (no supporting structure unless used to bring astronauts or certain cargo to a space capsule) and all-electric clean and green propelled space technology that can bring space capsules, satellites and equipment materials to the ISS and back to earth safely, without pollution, noise or environment hazards. It comes back to its geo-positional location where it started and before touch down the spec elevator can stay floating above the ground for total control.

In the embodiments, the lifting power of helium gas is used to overcome the force of gravity partially or even completely instead of using highly explosive and dangerous chemical propellants as explained above.

In a high altitude wind turbines system (known as HAWTAS and described in U.S. Pat. No. 9,732,967, the contents of which are incorporated by reference herein in their entirety) may be used in which helium gas is utilized. Helium is as lighter than air gas to elevate the turbines from ground overcoming the force of gravity in a controlled manner. Thus, the new technology for the space elevator is based upon the use of helium (He) to overcome, completely or partially, the force of gravity and help to elevate the shuttle to the outer space using just the force of the lighter than air gas helium. However, the space elevator would not leave the earth atmosphere's upper layer, the thermosphere, but would only reach its outer limit, because the space elevator needs the force of gravity to return to ground again. At the point of arrival of the space elevator, a large space-platform maybe built with reasonable costs, much less than the price predicted by NASA. This large space-platform may be used as a launch platform for future space missions into the outer space using larger and much cost effective space ships as the force of gravity here at the edge of the exosphere is at a minimum of ts force. Additionally, this platform can provide a habitat for astronauts and engineers that may be built for future research and development of new space instruments and equipments.

However, instead of the huge weight of the dangerous propellants that a space rocket need to carry at the start only the weight of the three helium tanks, which are a fraction of the propellants' tanks weight that a conventional space rocket need to carry. Because the helium gas is less in weight than even air the volume of the helium gas tanks are large in volume, at least 50 feet each in diameter, which can be tolerated. Additionally, the material of which the helium tanks is made to have light weight.

First, embodiments will explain how this is possible and the fact that the space elevator would only reach to the troposphere alone then allowing the upper capsule to start its short journey from the troposphere's "border" into the exosphere where the force of gravity have little effect upon objects.

Therefore, the space elevator needs the force of gravity in order to return to earth. This is possible by the actuation of two forces: one by simply pumping air into the lower part of the space elevator the "hover-craft like" cushion and inside the whole space ship elevator that would partially neutralize the helium lifting effect and helps to bring the space elevator r smoothly and slowly to earth. The second force is the force of action-reaction, in accordance with the third law of motion in physics (To every action there is an equal and opposite reaction a simple but valid law even in space). As the space elevator reaches the upper most zone of the thermosphere, the space capsule will automatically starts it electric jet turbine that will catapult the capsule into the exosphere, but the thrust that the space capsule exerts upon the space elevator downwards in order to move upwards, it will give a strong push to the space elevator by the force of counter reaction to the upward action of the space capsule, thus helping the space elevator to be pushed towards its journey back to earth's troposphere and back to its base. However, the space elevator may make several trips to the stratosphere and each time may also pick up the first space capsule it has ejected in the first trip and then after ejecting the second new space capsule, the first one may be maneuvered in such a way that it locks into its position on top of the space elevator from where it was ejected guided by a pre-programmed software. Additionally, the key for the controlling of the space elevator is the regulation of the atmospheric air inlet or outlet within the Space elevator in such a way that whenever air is let out, the airship will ascend by the uplifting force of the helium gas and whenever air is let in the airship will descend.

It may be understood that helium has am atomic radius is 31 pm while hydrogen is 53 pm. Helium has more in weight than hydrogen element due to having more electrons and protons (4), but atomic radii of helium is smaller than hydrogen 2. Helium is the smallest element in whole modern periodic table. However, helium is very volatile and easy to leak out, for which reason a material that would inhibit helium from leaking out can be utilized.

Gravity decreases with height, such that linear extrapolation at a height of one half of the Earth's radius—(9.8 m·s$^{-2}$ per 3,200 km.) However, the size of the gravity force at an altitude of 200 km is still about 94% of what it was at sea level. The gravity force on an object from the Earth is the same regardless of whether the object is surrounded by air (or water, or anything else). However, the air does not have a sharp edge. It gradually gets thinner and thinner. Even the International Space Station, 250 miles up, runs into air molecules, causing it to slow down and lose altitude. It must be periodically boosted up using rockets. The ISS remains above the earth because it is in orbit around the Earth. It is falling freely toward Earth, but it is traveling so fast that the curvature of its path matches the curvature of the Earth. It's the same reason that the Moon doesn't fall to Earth, and the Earth doesn't fall into the Sun.

Further, the following data may be understood with respect to the embodiments:
  Exosphere: 70 to 10,000 km (440 to 6,200 miles);
  Thermosphere: 80 to 70 km (50 to 440 miles);
  Mesosphere: 50 to 80 km (31 to 50 miles);
  Stratosphere: 12 to 50 km (7 to 31 miles); and Troposphere: 0 to 12 km (0 to 7 miles).

BRIEF DESCRIPTION OF THE FIGURES

Advantages of embodiments of the present invention will be apparent from the following detailed description of the exemplary embodiments. The following detailed description should be considered in conjunction with the accompanying figures in which.

Exemplary

Exemplary

Exemplary

Exemplary

Exemplary

Exemplary

Exemplary

DETAILED DESCRIPTION OF THE EMBODIMENTS

A main goal of the embodiments is to find an alternative or a solution for the prohibitly expensive, dangerous and indeed explosive rocket propellants (most commonly used are liquid oxygen, alcohol, kerosene, and liquid hydrogen) in order to overcome the force of gravity. As helium is lighter than air gas and has been proven to be safe and functional in many real transportation travel used by Zeppelins and Zeppelin like airships around the world. Studying its properties and limits for this present invention's specification was obligatory. The main problem so far identified is the leakage of helium gas so that each trip an airship need to refill its tanks with the gas again. This fact is due to the size of the helium atom which is the smallest in size as said earlier in the universe. However, a solution for this problem was found in a material that can be sprayed to the helium tanks from the inside or outside of the helium tank which will stop this leakage to almost 98%.

In one embodiment, there is a gyroscope just under the space capsule that would turn the space elevator 180° in a top down position in order to exploit the falcon's dive aerodynamics feature of minimum air resistance upon the space ship. The gyroscope will then turn around the space ship in its upright position as the space elevator approaches earth and touch ground. At all times the gyroscope will keep the balance and upright vertical position of the space ship except at the said downward trip back to earth. There are at least two gyroscopes: one inside the space elevator and one inside the capsule.

The air pumps inside the space elevator (not shown) would inject and expel air as required for the space elevator to move up or down to earth in a controlled manner piloted by the board computer and an artificial intelligence or deep-learning AI algorithm software on board the space elevator to coordinate and regulate all movements of the space ship and the gyroscope movements required at all times.

This technology is a continuation of the other last three technologies also awarded patents: the "High Altitude Wind Turbines System" HAWTAS, the "All electric Aircraft" SkyRider and the "Electromagnetic Generator for vehicle and Power Plant": These are the following U.S. patents and patent applications, each of which is incorporated by reference in their entireties: Hawtas, U.S. Pat. No. 9,732,967, EMG Vehicle U.S. Patent Publication No US20200007018A1, and DE Boat U.S. Pat. No. 9,419,545.

Figure 1:
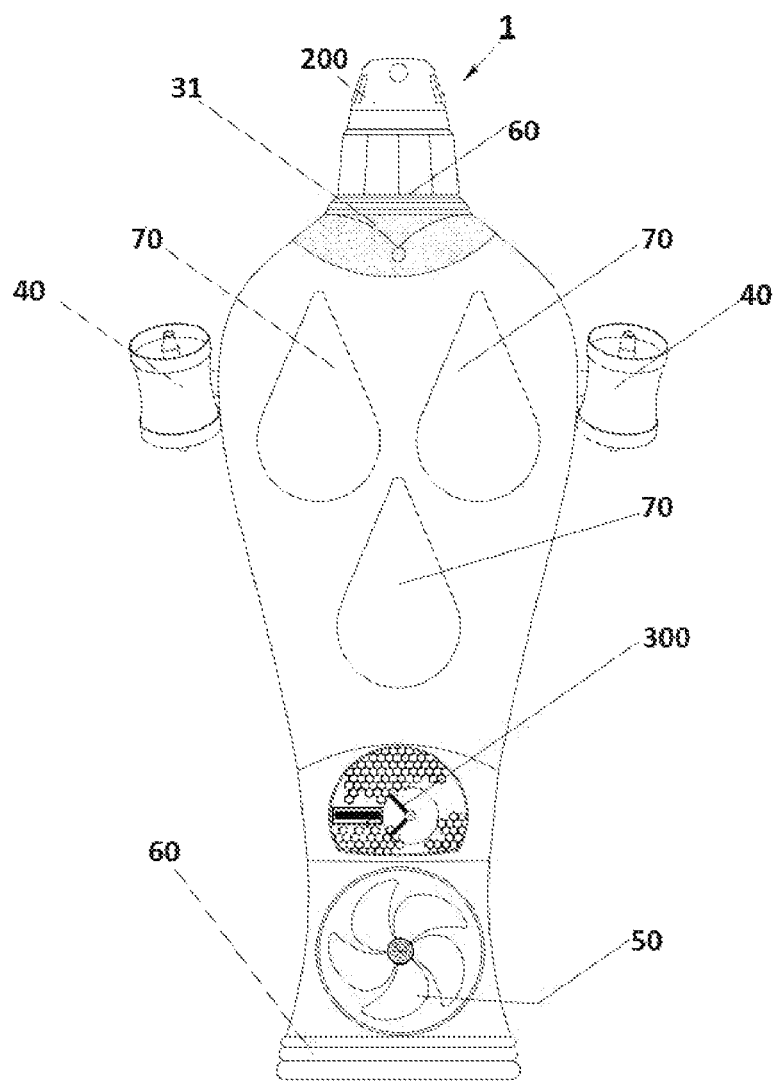
FIG. 1 shows a detailed arrangement of a first embodiment of the space elevator.

FIG. 1 shows an embodiment of an exemplary arrangement of the space elevator in which the main body 100 of the space elevator has an aerodynamic shape and mode inspired by a falcon diving down to earth. Important is the control of the relationship between the helium gas in the three tanks 70 is balanced in such a way that the airship is always in a relatively stable and upright position. The atmospheric air is pumped in or out as the situation requires. For example, at rest, the two hover craft-like cushions 60 are filled with air to keep the space elevator ship on the ground. Once the space elevator needs to lift up the air insides these two cushions are released slowly, and the space elevator would move upwards in a controlled manner. Also, the space between the helium tanks may be used to fill atmospheric air inside to keep the elevator on the ground. Once the space elevator has reached its final position at the stratosphere the space capsule 200 shall be ejected by a catapult mechanism (not shown). This catapult mechanism is also connected and simultaneously at the same time another catapult mechanism is to push up the upper helium tank 70 to close the gap left by the space capsule when ejecting the space capsule. The space capsule is equipped with an electric jet propulsion turbine that would provide enough power to bring the capsule safe to the ISS or the satellite to its predetermined orbit. As the space capsule kick off to the outer space a counter and opposite reaction (Newton's third law of force) that would act upon the space elevator downwards that indeed would be used to send back the space elevator to earth again. At this point, the upper tank 70 would have closed the opening left by the space capsule and the space elevator would also turn around by 180° downwards while the helium tank 70 in place would create an advantageous and appropriate aerodynamics of the space elevator in this way down to earth. There is a state of the art digital gyroscope on board (not shown) of the space elevator that would allow this turnaround of the space elevator down to earth and keep the ship stable and at right position at all times. There are different types of gyroscopes based on different operating principles, such as the microchip-packaged MEMS gyroscope as found in electronic devices or ring lasers, fiber optics gyroscope, and/or even the extremely sensitive quantum gyroscope. Further, there may be placed at the top of the space elevator just under the capsule 200 in a ring form for an array of micro solar cells or possibly flat metallic solar photovoltaic cells. (See Nature Communications (2020). DOI: 10.1038/s41467-020-17015-9). Further, just under the space capsule 200, there is a ring form area that is covered with solar micro lenses 31 that provides energy to the inside power generator's (300) battery 18; as it is an open energy system (see below details of FIG. 3).

Figure 2:
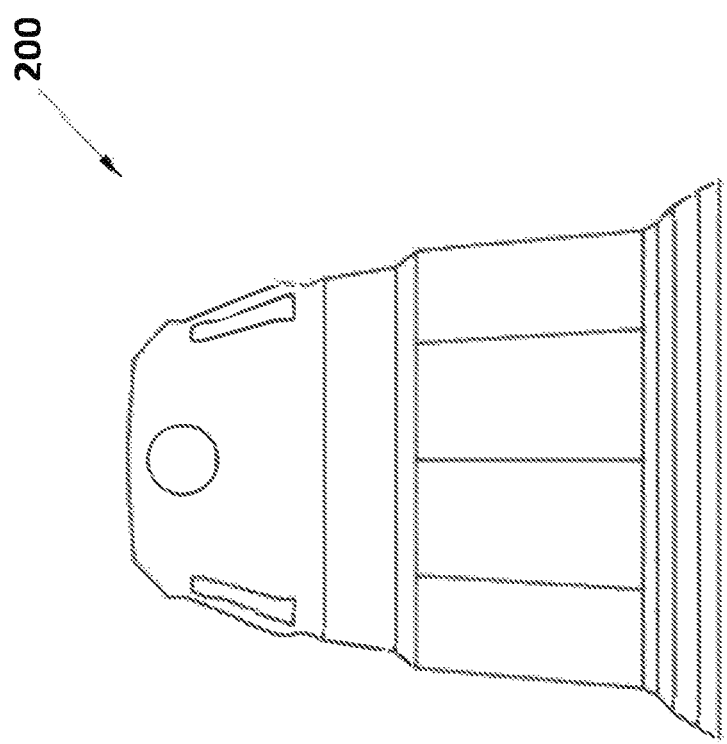
FIG. 2 shows a space capsule.

Turning to exemplary FIG. 2, FIG. 2 shows a state of the art space capsule 200 in which instruments, equipment, goods or research material and/or even astronauts to be transported safely to the ISS. The space capsule may also transport a satellite, a weather station, or an internet satellite or equipment to be brought in orbit around the earth. Once the space elevator has reached the upper stratosphere a catapult like mechanism would eject the space capsule into the outer space in order to reach the ISS or place a satellite into pre-stabilized orbit. The space capsule is propelled by an electric jet propelling turbine as newly developed by Rolls-Royce® and Siemens® which has up to 300 HP or another appropriate propulsion element, as desired.

Figure 3:
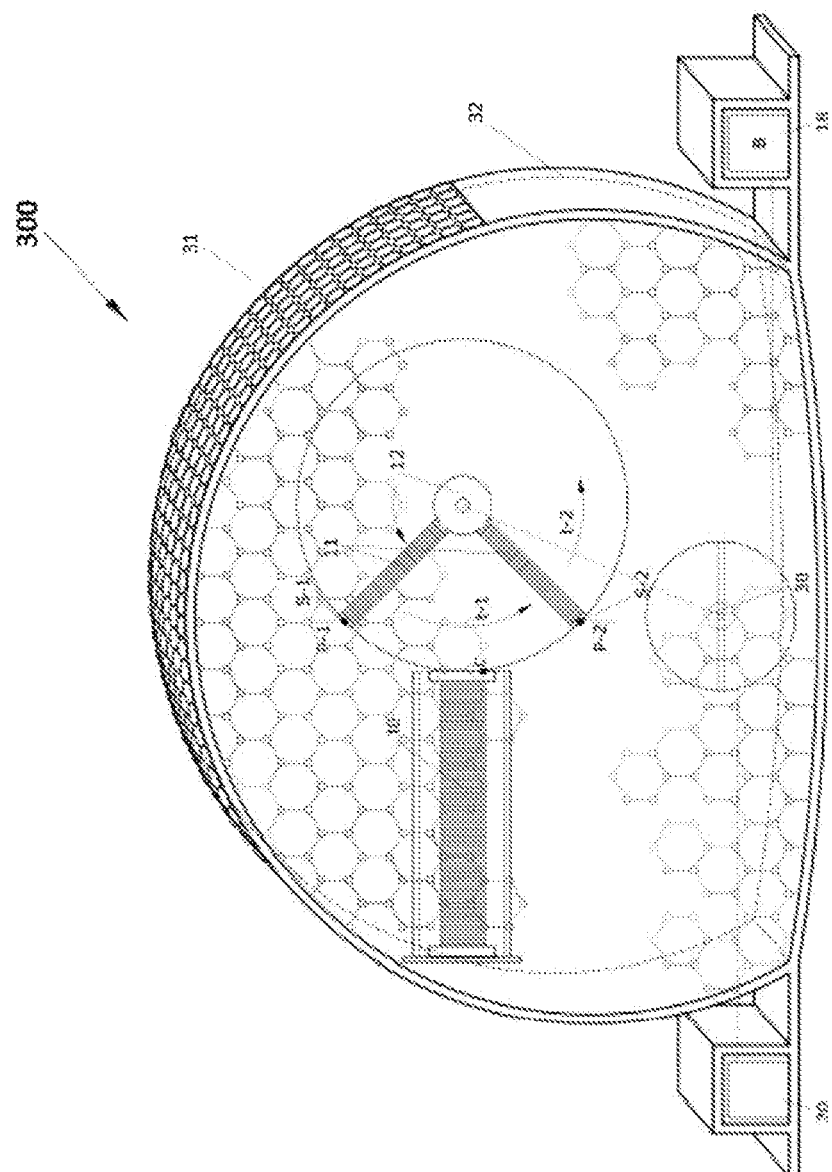
FIG. 3 shows the rotational electromagnetic power generator.

Referring to exemplary FIG. 3, the magnetic cylinder 10 may be placed in such a way that its magnetic equal (+ve or −ve pole) force is substantially directed at the other magnetic blade 11. There may be a point of time in which the magnetic cylinder 10 and magnetic blade 11 reach nearer to one another, referred to as the "point of incident" (PI). PI is the point of time when the magnetic cylinder 10 and magnetic blade 11 come near enough to one another in order to repel one another and thus the blade 11 may continue to rotate. Once the blade 11 passes a critical point P (P-1 or P-2), the magnetic force of magnetic cylinder 10 may drive the blade 11 by repulsion in an anti-clock-wise direction (t-1/t-2: the direction may also be clock-wise direction as desired by controlling the polarity).

Referring still to exemplary FIG. 3, the blade 11 may be welded to a metal shaft 12 which may rotate in a circular motion as the blades set in motion by the force of the magnetic field exerted by the magnetic cylinder 10 upon the blade 11. Around the central shaft, there may be a stator (generative coil housing) which may produce electricity as the shaft 12 rotates inside this stator. In an exemplary embodiment, the shaft 12 is welded to said blades 11 substantially at the center of this electromagnetic assembly.

The magnetic field of magnetic cylinder 10 may only be magnetic at the moment when the blade 11 has just reached position C which may be slightly downward of the critical point (P-1) to make sure that the current flows only when the blade 11 has passed the critical position (P-1 or P-2) for the actual repulsion forces to be took place and also the contact point at which time only current would flow from battery 18 in order to magnetize both cylinder 10 and blade 11 to push it further into an ever faster accelerated angular motion. There may be sensors, S1 and S2, each placed at critical positions, P1 and P2. The sensors may signal for each critical position of the magnetic cylinder 10 with the blade 11. Once blade 11 and magnetic cylinder 10 have reached P1, the work (energy) done by magnetic cylinder 10 and blade 11 may be transmitted to the flywheel 30 for storage and eventually can be used for rebooting the system from stored electrical power inside the flywheel 30 or from an external battery 18. Thus, the blades 11 may then receive only the repulsion or "push-force" from magnetic cylinder 10 to continue its rotations in one direction (t-1/t-2) at all times. Additionally, the rebooting of the system may also be powered by the flywheel on board of the space elevator in order to keep the battery 18 charged at all times. Additionally the rebooting of the system maybe also powered by the solar electric energy produced on the outside surface of the space elevator just under the capsule 200 providing the energy required in order to keep the battery 18 charged at all times. Thus, the system is indeed an open energy system, from a thermodynamic point of view, and not a perpetual mobile in any sense of the term. Further, since the whole power generator 300 is inside the space elevator body the solar cells that are needed to keep the battery 18 charged at all times may be placed at the top of the space elevator just under the capsule in a ring form using possibly flat metallic solar photovoltaic cells.

The whole system may be controlled and wired by an overall electronic central unit 20 which also controls other components of this device.

Additionally, all other components around the magnetic cylinders 10 and 11 may be constructed of a material which is non-magnetic and therefore not attracted by the magnetic cylinders at all times. Such a material may be aluminum or carbon alloys, which are very hard and resistant to corrosion. However, the whole magnetic embodiment may be placed inside a CNT case 32 which shields the system from the environment for all reasons of interference with any other metallic objects herein or around the arrangement on top of which there maybe additional micro lenses 31 for additional power generation using sun light in this case.

The sensors may be programmed by software in such a way that the movement of magnetic cylinder 10 is coordinated and substantially synchronic to blade 11 to receive the maximum amount of magnetic repulsion or push to continue its angular revolution on its axis 12. Such sensitive software program systems are well known to those skilled in this art. After an initial repulsive "push," blade 11 may continue to move in its circular movement at ever higher velocities as controlled by hardware device 20.

The system may need to be placed in a vacuum to reduce air resistance on the moving blade 11. Additionally, a recycling coolant or water radiator (not shown) may ensure low temperatures and reduce frictional heat produced by the blade circular movement and may assist in obtaining higher speeds and efficiency, while the frictional heat maybe used to heat the space elevator cabin inside the capsule 2000.

The rotary-shaft 12 may be embedded in a shielded magnetic field or connected to generate electricity for the electric jet turbine.

Figure 4:
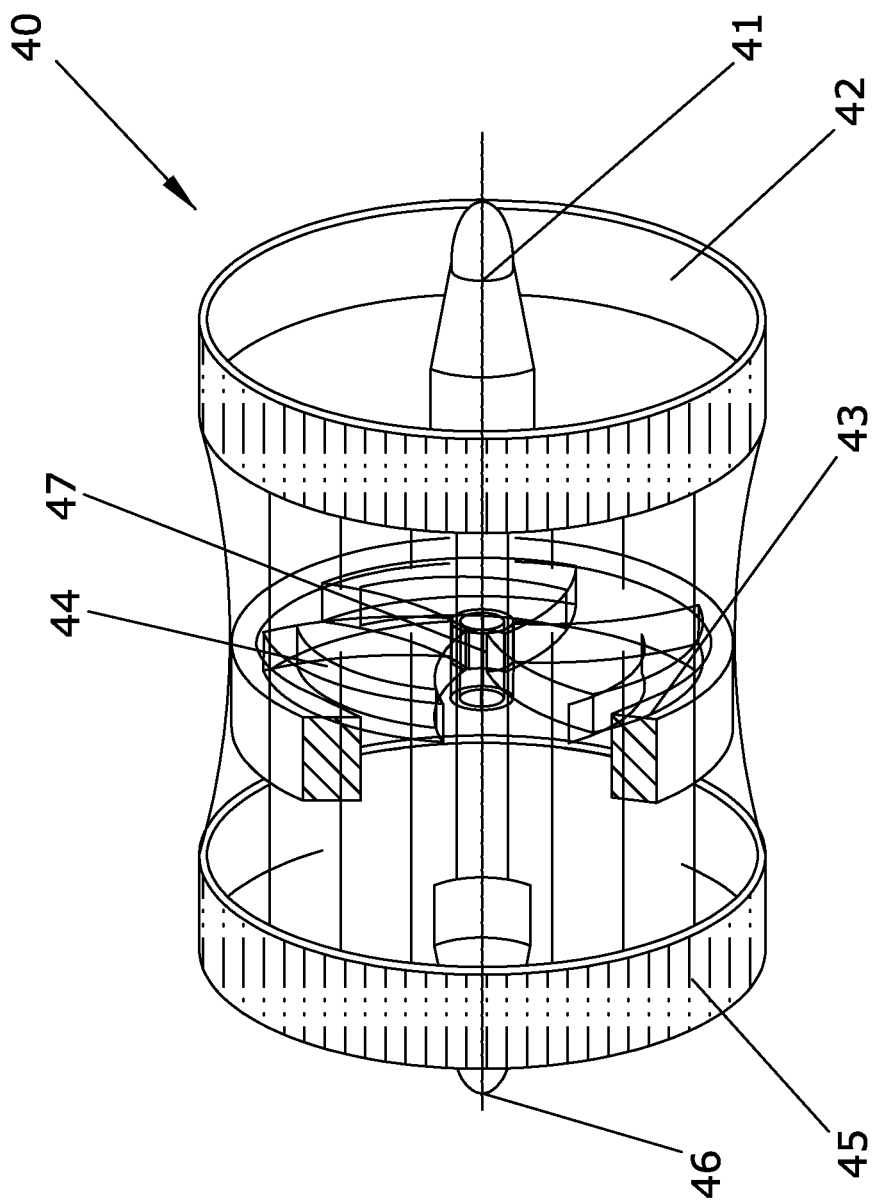
FIG. 4 shows one of the two wind turbines.

Now referring to exemplary FIG. 4, a power generating wind turbine 40 may be used to harness the wind energy as the space elevator moves upward and the air thrust is extremely high on the blades 44. The inside turbine 41 may include an outer case 45, turbine blades 44, and a central stator magnet 43. Either end of the main turbine 40 may have an aerodynamic structure form 46 to allow smooth passage of wind through its blades 44 in such a way that blades 44 may rotate due to wind from the front of the vehicle and thus may cause shaft 47, onto which blades 44 may be fixed, to rotate inside a stator structure 42. The turbine's blades 44 may be constructed in such a way that they may rotate and generate electricity against the direction of the wind as the aerodynamic structure form 46 depicted in FIG. 4 may alternatively be hollow to allow the smooth flow of air through the turbine 40, to reduce the weight of the turbine 40, or for other reasons. This may increase the overall efficiency of the turbines 40. Further, the turbine blades 44 may be constructed from lightweight material, for example carbon-epoxy-composite (CFRP). Turbine blades 44 must have a forward propelling design and form as those skilled in the art would understand that this design would be different from a fixed geo-positional blades form as here the wind turbine has also the function of propelling the vehicle forwards besides generating power. Blades 44 may themselves have a structure constructed through the use of 3D printing or may be constructed from solid material. However, the blades 44 are necessarily shaped in such a way and designed so that the wind turbine is also a propelling device of the Space elevator itself. The location of the two wind turbines may also be placed at a higher position for example at the height of the upper helium tank in such a way that it is integrated within the embodiment of the space elevator itself and not placed outside of it in order not to increase the air resistance surface of the vehicle for aerodynamic reasons. The two wind turbines have another function as well: similar to the rotors of a helicopter they sustain the equilibrium of the space elevator. The rotation of the wind turbines' blades are in opposite direction to the main propeller's blades 50 in FIG. 5

Further, the two power generating wind turbines 40 may turn and be locked in 90° positions forwards or backwards against the wind direction, while parking on ground, in order to generate electric power that may be stored in the flywheel or at an external capacitor for needs on board the space elevator.

In still further embodiments, there are at least two wind turbines 40 that may be placed at the center of the space elevator, i.e., at its largest width for more stability and equilibrium of the spaceship. There may be four or even eight wind turbines depending on the weight to be lifted to outer space. As the pressure drops with altitude and air become very thin for the wind turbines to generate enough upward thrust, Rolls-Royce-Siemens electric jet turbines (similar to the jet turbine inside the space capsule) may replace two of the wind turbines to provide the needed upward thrust for the space elevator.

Figure 5:
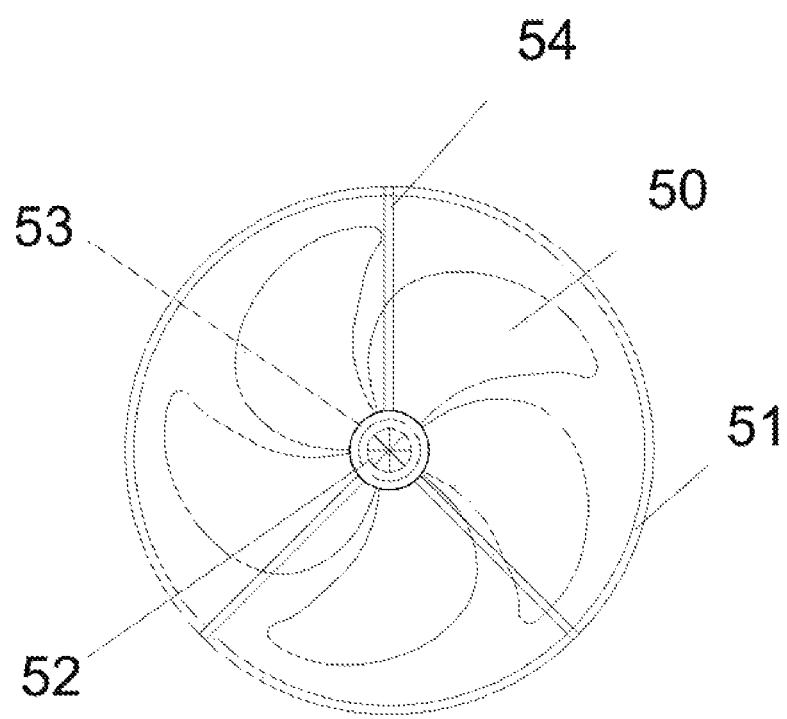
FIG. 5 shows a five blade propeller rotor.

Now turning to FIG. 5 it shows simply a five blade rotor propeller 50 as even used and proven to be a most efficient design for the propulsion of ships in sea. The only difference between air and sea water is its viscosity coefficient and/or its density (The viscosity of a fluid is a measure of its resistance to deformation at a given rate. For the viscosity of air is $1.81 \times 10^{-5}$ kg/(m·s), 18.1 µPa·s or $1.81 \times 10^{-5}$ Pa·s. At 15° C.; viscosity of water is $8.90 \times 10^{-4}$ Pa·s or $8.90 \times 10^{-3}$ dyn·s/cm$^2$ or 0.890 cP at about 25° C.) but not its propulsion characteristics. Therefore, the use here of similar five blades rotor propeller is advantageous for this embodiment of the invention. However, the material of the propeller has to be light weight and extremely strong and resilient. Thereafter, the turbine blades may be constructed from lightweight material, for example carbon-epoxy-composite (CFRP) or a composite of graphene oxide and lignin is used to build this propeller that may be manufacture with a 3D printing procedure. Graphene is 200 times stronger than steel thus it is extremely resilient material for this purpose.

The two wind turbines will have a mechanism and a slot built on the side of the space elevator that would allow their movement directed upward to allow the stabilization of the space elevator in particular during landing so that in coordination with the propeller 50 is provided. The propeller 50 shall rotate in an opposite angular direction as the wind turbines (which must be in an up-right position) to function as a helicopter does by remaining firm and floating above the ground for total control of the space elevator landing on its predetermined geo-positional location.

Still referring to exemplary FIG. 5, the propeller 50 is made of lightweight graphene oxide composite similar to the composite material of the wind turbines 40. The propeller 50 is placed in a ring form 51 and cage-like supporting structure 54 can rotate (powered by an electric motor 52 at the center-mounted on an axis 53) in two distinct positions: one in which the propeller's blades are horizontally parallel to the ground during lift-off and travel to the outer space, providing upward thrust to the space elevator; and the other position of the rotating propeller 50 is at 90 degrees perpendicular to the ground (as shown in FIG. 1) in an upright position during landing only in order to stabilize the space elevator in its upright position, floating above the ground. This technology is based on the helicopter principle known to those skilled in the art and aeronautic technology. The power needed for both the propeller 50 and the Rolls-Royce-Siemens jet turbine(s) shall be provided by the electromagnetic power generator 300 (via the stored energy inside the flywheel in said electromagnetic generator 300) and the wind turbines 40.

Figure 6:
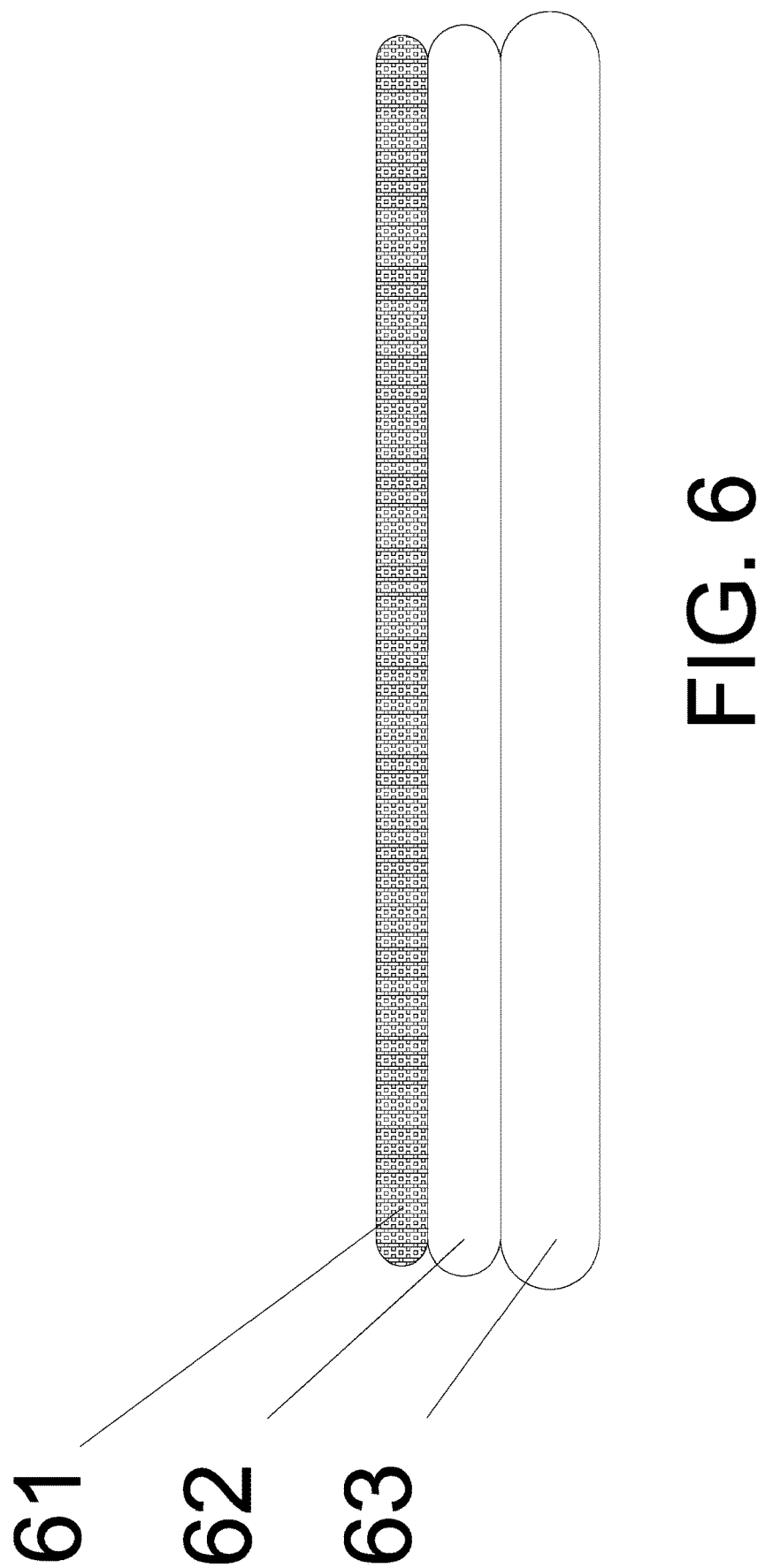
FIG. 6 shows double hover-craft-doughnuts-like cushions.

Turning now to FIG. 6, this figure shows two cushions 60 one on top of the other around the five blades propeller in a form of a doughnuts hovercraft-like structure made of highly resilient material of a carbon-fiber-lignin composite, which is all organic and hence environmentally friendly material. The upper ring 61 contain all the electronic equipment and board-computers in three redundant manner to guarantee the functioning of the systems inside the space elevator at all times. The two cushions below 62 and 63 have the size of a two story building and may also contain helium gas if necessary and/or air as the weight required to be transported.

Figure 7:
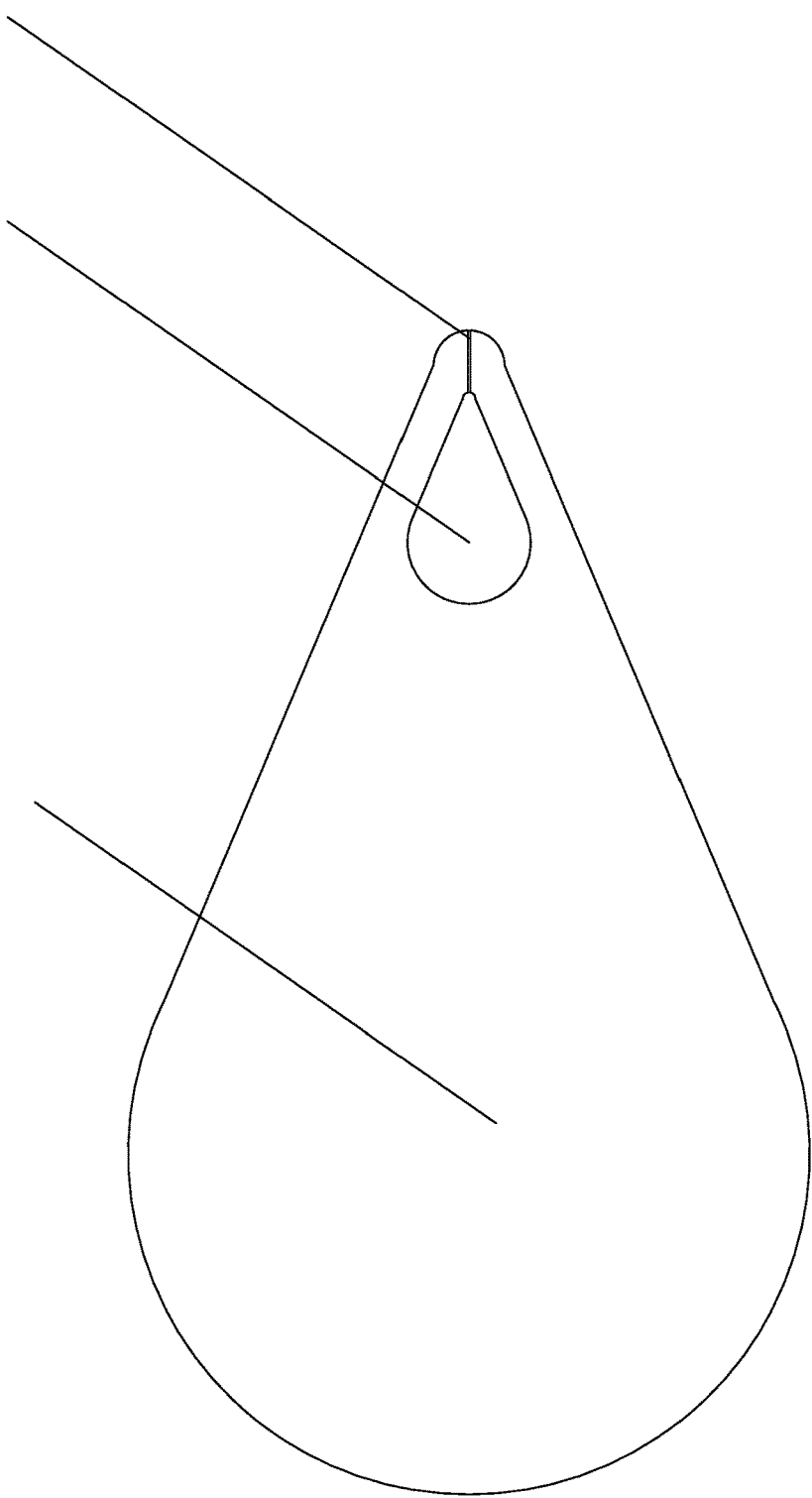
FIG. 7 shows one of the three helium containing tanks with the "ballonet" inside it.

Now referring to FIG. 7 it shows one of three similar helium filled tanks 70 also made of highly resilient but light weight graphene in a graphene-oxide-lignin composite deposited with helium blocking material. Inside each helium tank 70 there is a so-called "ballonett" 71 that has the function to equalize the pressure inside the helium tanks 70 and the whole space elevator. Thus, the ballonet has to maintain the helium tanks from collapsing due to changes in the atmosphere pressures as the space elevator rises in the higher atmosphere layers. Thus, the "ballonet" 71 keeps the pressure inside above the atmospheric pressure outside the space elevator as it rises and the outside pressure drops. This function by means of a pump (not shown) connected to a solenoid two-way valve and a sensor 72 in which atmospheric air is let in or out as required for the stabilization of the whole space elevator. The function of this pump is also controlled by the board computers as for the whole space elevator's system's function. (See, e.g., European patent EP0872413A2, which is incorporated herein by reference in its entirety.)

Lignin is a waste material from the paper industry but a perfect material for this object of the invention because lignin is mainly made of natural organic carbon fibers that are extremely robust and resilient material and can be easily modeled into the shape as shown here. Also, this material is abundant in nature and renewable as trees can be regrown and thus available at a relatively low cost. The seize of each tank 70 may rise to the height of a three-story building and the whole SpaceRider may reach a 100 meter in height, 50 meters at the height of the helium tanks and the base 30-40 meters wide. Further the maximum weight that the space elevator thus can uplift is 15-20 tones (or max. 44092.452437 pounds.) of equipment and astronauts inside the space capsule 200.

Helium is less dense than air. Helium has 0.0114 pounds per cubic foot. One cubic foot of helium would have gravity pull equal to a force of 0.0114 pounds but the air pushes up with a force equal to the weight of the air the helium displaced, or 0.0807 pounds. The difference in the up and down force is 0.069 pounds. Thus, each cubic foot of helium could lift 0.069 pounds. Therefore, in order to lift 100 pounds, for example, 1449 cubic feet of helium is needed. Therefore, the diameter of these helium tanks may reach 25 meters each.

The upper helium tank is connected to a catapult mechanism that would push upward the tank to lock in place of the ejected space capsule, hermetically tight, in order to close the opened gap left by the space capsule. The trip back to earth starts with the lock in of the helium upper tank of the space elevator in place of the ejected space capsule and closing the gap hermetically before turning by 180° downwards with the help of the gyroscope instrument on board (as described above in FIG. 1 in details). The dive downwards of the space elevator is strictly controlled by the doses of pumping of atmospheric air into the hover-craft like cushions in such a way that the air is gradually increased in order to minimize the air-friction of the space elevator in the atmosphere otherwise the space elevator would catch fire indeed. Once the space elevator reached a height of about 3 km above the earth more air is pumped in into the space around the helium tanks so that the airship would slowly turn around to an upright position with the help of the gyroscope and the propulsion propeller. The Space elevator would be able even to float even in the air and then slowly move downwards and come to a halt at its pre-stabilized geo-positional location, guided by GPS, where the space elevator has been launched in the first place. The is maneuver being for those skilled in the art is routine practice of a space control mission team.

What is claimed is:

1. A earth to space transport system, comprising:
   a main body;
   a plurality of storage cells disposed in an inside of the main body, the storage cells configured to store helium;
   one or more electric jet propulsion turbines coupled to the main body;
   a first inflatable cushion disposed at an exterior of a top of the main body and a second inflatable cushion disposed at an exterior of a bottom of the main body;
   a space capsule disposed above the first inflatable cushion;
   a power generator;
   a rotor propeller; and
   at least one wind generator disposed on the main body;
   wherein each of the plurality of storage cells further comprise a ballonet that keeps pressure inside the main body above atmospheric pressure outside of the main body when the main body is in motion.

2. The earth to space transport system of claim 1, wherein the first cusion and the second cushion are inflated when the main body is on the ground and deflated when the main body is not on the ground.

3. The earth to space transport system of claim 1, wherein the space capsule is configured to eject from the main body when the main body reaches a predetermined altitude.

4. The earth to space transport system of claim 3, wherein the ejection of the space capsule from the main body propels the main body downwards.

5. The earth to space transport system of claim 1, further comprising one or more gyroscopes inside the main body.

6. The earth to space transport system of claim 1, wherein the power generator comprises at least a magnetic cylinder, a magnetic blade, a battery, and a flywheel.

7. The earth to space transport system of claim 1, wherein the power generator is located in a vacuum compartment of the main body to reduce air resistance.

8. The earth to space transport system of claim 1, wherein the rotor propeller has five blades formed from graphene oxide composite.

9. The earth to space transport system of claim 8, wherein the propeller is placed within a ring form, and a supporting structure around the propellor moves from a first position to a second position when the main body is in motion.

10. The earth to space transport system of claim 1, wherein the first cushion and the second cushion are formed of a carbon-lignin composite.

* * * * *